INVENTOR.
ELLIOTT J. ROBERTS
BY Arnold Grant
ATTORNEY.

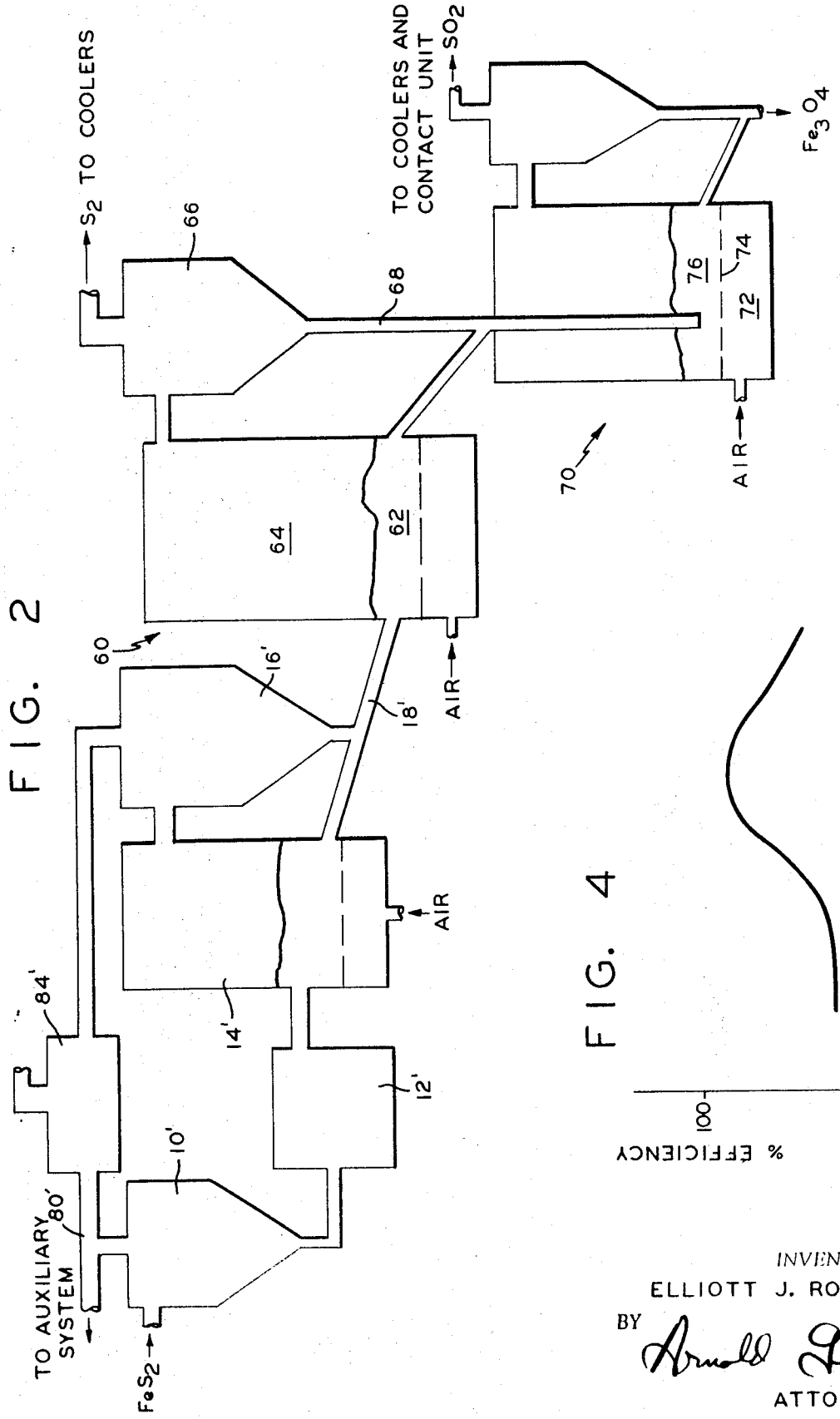

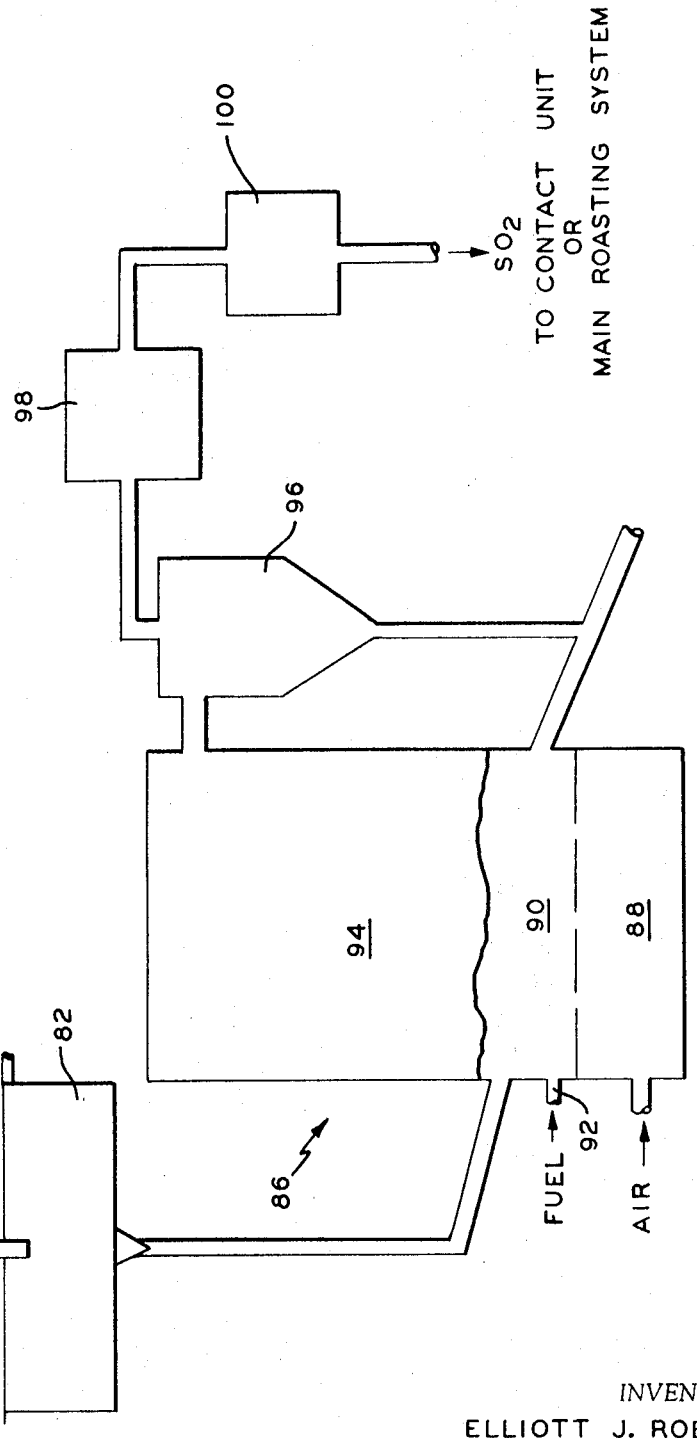

United States Patent Office 3,589,866
Patented June 29, 1971

3,589,866
ROASTING OF PYRITE
Elliott J. Roberts, Westport, Conn., assignor to
Dorr-Oliver Incorporated, Stamford, Conn.
Continuation of abandoned application Ser. No. 653,976,
July 17, 1967. This application Sept. 24, 1969, Ser.
No. 860,843
Int. Cl. C22b 1/10; C01b 17/06
U.S. Cl. 23—224         4 Claims

ABSTRACT OF THE DISCLOSURE

A process for improving the efficiency of generating elemental sulfur from the roasting of pyrite comprising preclassifying the pyrite; roasting the coarse fraction in a main roasting system; roasting the fine fraction in an auxiliary roasting system; and, combining at least part of the product of the auxiliary roasting system with one of the products of the main roasting system.

---

This application is a continuation of application Ser. No. 653,976, filed July 17, 1967, now abandoned.

The decomposition of pyrite to elemental sulfur and/or sulfur dioxide is generally performed by either of two processes. In the first of these methods the pyrite is heated in a reactor, by the combustion of oil, to decomposition temperature, the reaction being:

$$FeS_2 + heat \rightarrow FeS_{1.2} + .4S_2$$

The resultant elemental sulfur, which represents approximately 40% of the sulfur present in the original pyrite, is discharged from the reactor as a gas and is recovered in the liquid form by subsequent treatment in a series of cyclones, waste heat boilers, electrical precipitators and sulfur recovery units. The remaining, granular pyrrhotite is then discharged to a second reactor where it is oxidized to generate sulfur dioxide which is, then, in turn, converted to sulfuric acid.

The second method, which has only recently come into prominence, is a two stage roasting process involving a system of interconnected fluidized bed reactors and cyclones to extract all the sulfur content of the pyrite as elemental sulfur. In this process feed pyrite is also introduced into a first reactor and decomposed according to the above formula to form pyrrhotite and elemental sulfur. The pyrrhotite is transferred through suitable piping from the first reactor to a second reactor where it is oxidized, this reaction which is exothermic and requires the removal of excess heat being represented by:

$$FeS_{1.2} + 1.95O_2 \rightarrow \tfrac{1}{2} Fe_2O_3 + 1.2SO_2$$

Gaseous sulfur dioxide produced in this second reactor is then, however, recycled back to the first reactor through a cyclone which interconnects the freeboard of the second reactor with the windbox of the first reactor. In the first reactor the sulfur dioxide is combined with a source of fuel, depicted below in the representative form for "Bunker-C" oil, $CH_{1.405}$, and reduced to elemental sulfur, the equation here being:

$$2SO_2 + 1.48CH_{1.405} \rightarrow S_2 + 1.48CO_2 + 1.04H_2O$$

The elemental sulfur and other gaseous products of this reaction then rise through the bed into the freeboard to mix with and join the sulfur formed in the first reaction, above. These gaseous products are discharged from the first reactor into a cyclone and from there into a similar system of waste heat boilers, precipitators and sulfur recovery units to recover and convert the gaseous sulfur to liquid form. This cyclone, however, has its underflow connected to the second reactor to, in turn, recycle any elutriated solids back into the system.

Applicant has observed that the efficiency of these processes is severely hampered by the inherent fineness of the feed pyrite particles. In the case of both the first and second process he has discovered that if any fine pyrite becomes elutriated by the rising gases in the first reactor and escapes the cyclone adjacent the freeboard discharge, it will flow into the gas-liquid conversion system and cause a serious non-productive heat drain on this stage of the process. Although, theoretically, this fine material was dissociated into pyrrhotite and sulfur, applicant has found that it has a tendency, when cooled for collection, to recombine by a reversal of the decomposition reaction. The recombination of the components, which is exothermic results in a liberation of heat where it is neither needed nor wanted. In addition, the heat that was used to dissociate these fine particles of pyrite into pyrrhotite and sulfur is wasted because the decomposition products have recombined into pyrite. Thus not only is the recovery efficiency hampered by the generation of heat, but the operating costs per pound of recovered sulfur are proportionally increased.

Applicant has further observed that the dust and very fine particles of feed pyrite cause even greater inefficiency in the second, two stage all sulfur, process. He has found that any stripped $Fe_2O_3$ which is carried out of the second reactor along with the rising $SO_2$ and escapes the cyclone, interconnected between the freeboard of the second reactor and the windbox of the first reactor, will oxidize the sulfur already formed in the first reactor according to the reaction:

$$1.95S_2 + Fe_2O_3 \rightarrow 1.5SO_2 + 2FeS_{1.2}$$

Thus, not only is the sulfur oxidized back to $SO_2$ which will require extra fuel in the first reactor to re-reduce it back to sulfur, but the iron is also sulfidized back to pyrrhotite. This pyrrhotite must then be returned to the second reactor where it will be oxidized again to sulfur dioxide, in turn, liberating more excess heat in the second reactor, which must be removed, and requiring more fuel in the first reactor for the retransformation back to sulfur. These then, were the major problems and the results of these problems.

Further investigations by applicant revealed the cause of these problems to be the inability of the cyclones to make the sharp differentiation required for effective dust prevention. When viewed on a graph comparing efficiency to particle size, cyclones do not exhibit sharp vertical cut-off curves at a particular desired particle size. The actual curve is instead gently sloping, looking somewhat like an elongated S with efficiency decreasing as particle size decreases. Thus, in the case of the second process, enough fines from the second reactor will escape the cyclone, interconnecting the second reactor freeboard and the first reactor windbox, and rise into the first reactor as cyclone overflow to completely undermine the efficiency of the system. For example, with a typical pyrite size analysis and an average cyclone collection efficiency we would get material going to and out of the second reactor approximately as follows:

TABLE I

| Size range, microns | Feed analysis, Ind. percent plus | Settling factor | 1st stage, weight in coarse | 2d stage Weight in coarse | 2d stage Weight in fines |
|---|---|---|---|---|---|
| +25 | 50.5 | 1.00 | 50.50 | 50.50 | |
| 20-25 | 10.0 | .995 | 9.95 | 9.90 | .05 |
| 15-20 | 9.8 | .98 | 9.60 | 9.40 | .20 |
| 10-15 | 9.7 | .92 | 8.92 | 8.20 | .72 |
| 7-10 | 6.0 | .81 | 4.86 | 3.94 | .92 |
| 5-7 | 4.0 | .70 | 2.80 | 1.96 | .84 |
| 4-5 | 2.0 | .58 | 1.16 | .67 | .49 |
| 3-4 | 2.0 | .49 | .98 | .48 | .50 |
| 2-3 | 2.0 | .38 | .76 | .29 | .47 |
| 1.5-2 | 1.0 | .25 | .25 | .06 | .19 |
| 1-1.5 | 1.0 | .16 | .16 | .01 | .15 |
| −1 | 2.0 | | | | |
| Total | 100.0 | | + 89.94 | 85.41 | 4.53 |

The last column of figures represents the $Fe_2O_3$ which is recycled from the second reactor through the cyclone back to the first reactor. This we term critical size material. This material would then, as described above, be cycled according to the following table:

TABLE II

| Size range | Recycle to 1st stage | Factor | Recycle to 2d stage | Back to— 1st stage | Back to— 2d stage |
|---|---|---|---|---|---|
| 20-25 | .05 | .995 | .05 | 0. | |
| 15-20 | .20 | .98 | .20 | 0. | |
| 10-15 | .72 | .92 | .66 | .05 | .05 |
| 7-10 | .92 | .81 | .75 | .14 | .11 |
| 5-7 | .84 | .70 | .59 | .18 | .13 |
| 4-5 | .49 | .58 | .28 | .12 | .07 |
| 3-4 | .50 | .49 | .25 | .13 | .06 |
| 2-3 | .47 | .38 | .18 | .11 | .04 |
| 1.5-2 | .19 | .25 | .05 | .04 | .01 |
| 1-1.5 | .15 | .16 | .02 | .02 | |
| Total | 4.53 | | 3.03 | 0.79 | 0.47 |

Total recycle to first stage=4.53+.79+.25=5.57 grams per 100 feed

Total out bottom $\begin{cases} 85.41 \\ 2.24 \\ .42 \end{cases}$ Total out top $\begin{cases} 10.66 \\ 1.50 \\ .32 \\ .05 \end{cases}$ Grand total ......... 88.07 ........................... 11.93

Thus the total recycle back to the first reactor would be approximately 4.53+.79+.25=5.57 grams per 100 grams of feed. With these figures the total out the bottom of the system is 85.41
2.24
.42
―――
88.07 and the total out of the top is 10.06
1.50
.32
.05
―――
11.93 which, as can be readily appreciated, seriously impairs the commercial feasibility of the system.

It is therefore an object of the present invention to overcome the above mentioned problems and to improve the economics of deriving elemental sulfur from the roasting of pyrite. Applicant has found that these problems can be solved by a careful classification of the pyrite prior to its introduction into the first reactor and separate treatment, in an auxiliary system, of the extremely fine and critical size particles.

The auxiliary system converts the fines to sulfur dioxide which, in the first sulfur/sulfur dioxide process, can be combined with the product of the second reactor to increase the yield of sulfuric acid; and, in the second, all sulfur, process can either be converted to sulfuric acid or, alternatively, introduced into the second reactor to increase the yield of elemental sulfur.

It is therefore another object of the present invention to classify the pyrite prior to its introduction to the first reactor.

It is yet another object of the present invention to separately treat the fine particles of pyrite in an auxiliary sulfur dioxide producing system.

The subject matter which applicant regards as his invention is particularly pointed out and distinctly claimed in the concluding portion of this specification. The invention, however, as to its organization and method of operation together with further objects and advantages thereof will best be understood by reference to the following descriptions taken in conjunction with the accompanying drawings in which:

FIG. 2 is a diagrammatic representation of a flow sheet for the sulfur/sulfur dioxide roasting process incorporating the present invention;

FIG. 3 is a diagrammatic representation of the auxiliary roasting system for treating the fines and extracting their sulfur content; and FIG. 4 is a diagrammatic representation of the efficiencies of these processes at various classification points.

Figure 1:
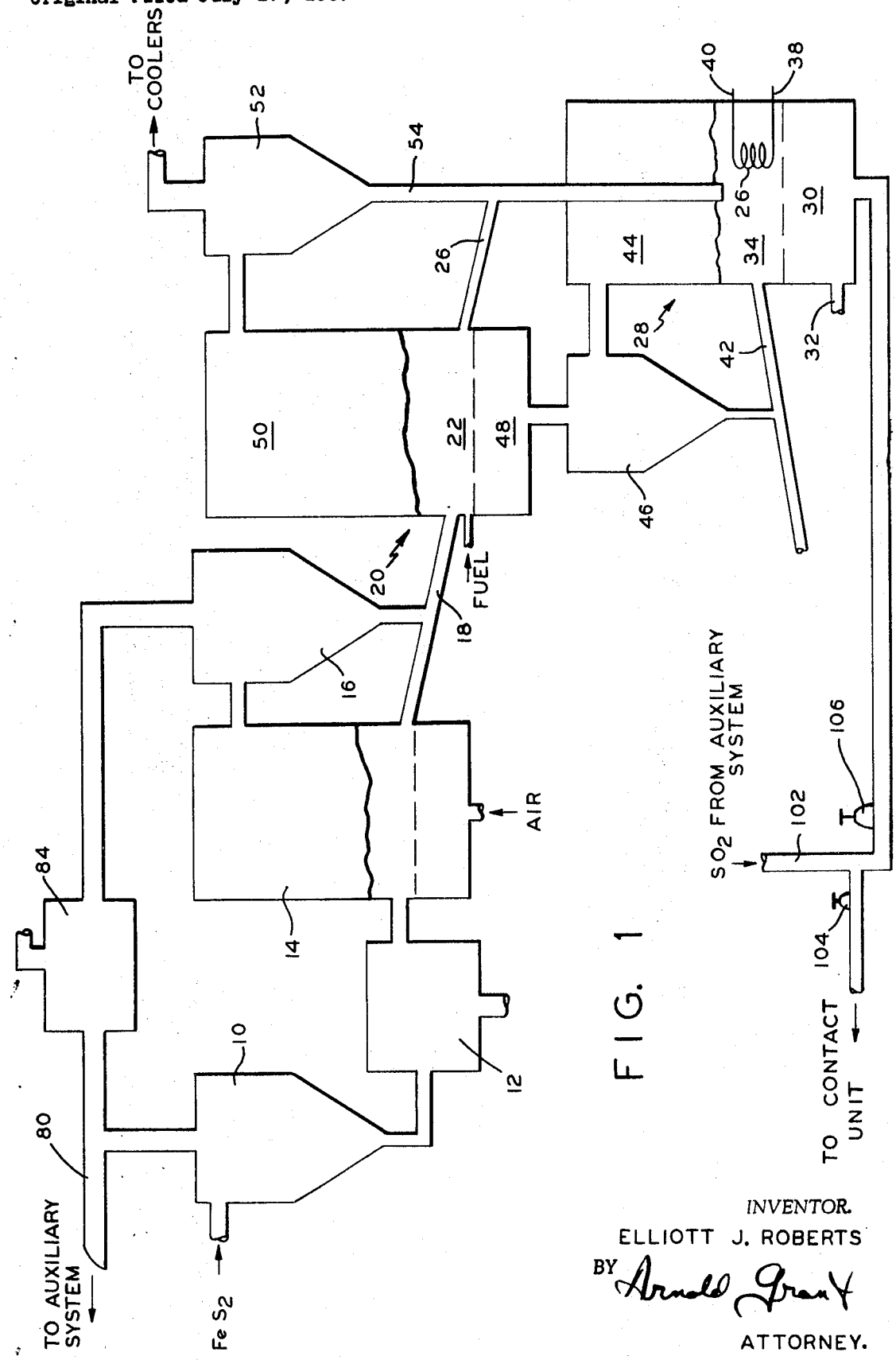
FIG. 1 is a diagrammatic representation of a flow sheet for the two stage, all sulfur, roasting process incorporating the present invention.

Referring now to FIG. 1 the two stage roasting process for extracting all the sulfur content from pyrite as elemental sulfur incorporating the present invention will be described in detail. Granulated pyrite, $FeS_2$, having a size distribution similar to that shown in Table I, above, is introduced into a classifier, here shown illustratively as a wet cyclone 10 for a classification into coarse and fine fractions. The classification may be performed either wet or dry, depending upon the condition of the pyrite when it is received, it may be performed in any type of classifier, and the cut-off size is adjustable, as will be explained below. Investigation by applicant has revealed that the outer limits of this classification are separations of about 10 and 25 microns. The optimum separation size for the classification depends on the size of the separation being made by the cyclones interconnecting the first and second reactors, and presently to be described. If, for example, these cyclones are set to make a 15 micron separation, a 15 micron separation being defined as one in which 95% of the material in the 14.9 to 15.1 micron bracket reports to the underflow, then the maximum recoveries with the minimum inefficiencies will be obtainable by preclassifying the feed at least one and preferably twice at 15 microns. However even a single 10 micron separation will have a significant effect in the heat load on the first reactor. FIG. 4 graphically depicts the relationship between cut-off size and efficiency; the efficiency begins to increase at about 10 microns, reaches a maximum in the 15–20 micron range, and gradually decreases in the 20–25 micron range. Most pyrite ore is so fine that a classification beyond 25 microns would remove so much of the feed material as to make treatment of the remaining ore impractical. With these fine and critical size particles removed from the system the efficiency of the system is no longer dependent on the stripping capability of the cyclones between the first and second roasting reactors and, as will be presently described, the amount of $Fe_2O_3$ which escapes from the second reactor to the first reactor is reduced to tolerable proportions.

The coarse fraction from the wet cyclone classification 10 reports as underflow and is transferred to a filter 12 for dewatering and from there to a fluid bed dryer 14. A separating cyclone 16 which has its feed inlet attached to the freeboard discharge from fluid bed dryer 14, performs the second classification of the feed pyrite insuring the desired particle size cut-off. The dried pyrite from fluid bed 14 and the underflow from cyclone 16 are then transferred through conduit 18 into the first stage fluidized bed roaster 20.

Fuel, which may be coal, oil or natural gas is injected into the fluid bed 22 through inlet 24 and part of it is oxidized, in a manner well known in the art, to provide the heat necessary for the decomposition reactions, from about 690° C. to about 740° C., and preferably about 700° C. The first reaction, which may be represented by the formula:

(1) $FeS_2 + heat \rightarrow FeS_{1.2} + .4S_2$ produces the intermediate product pyrrhotite and gaseous elemental sulfur. The pyrrhotite is transferred from the cyclone 52 as overflow and is then cooled in a manner well known in the art in a series of waste heat boilers, electrostatic precipitators and sulfur recovery units (not shown). Again, since the major portion of the fine critical size particles are removed in the classification step prior to the introduction of the pyrite into the main roasting system, the amount of dissociated fine pyrite that was heretofore working its way out of roaster 50 and escaping cyclone 52 to exothermically recombine in the waste heat boilers or other gas cooling equipment (not shown) is also reduced to a tolerable minimum.

As can be seen from the preceding table, assuming a 15 micron separation,

TABLE III

| Size range, microns | Feed | Settling factor, wet | Coarse | Coarse from dryer | Coarse from 1st stage | Coarse 2d stage | Recycle to 1st stage | Back to 2d | Back to 1st |
|---|---|---|---|---|---|---|---|---|---|
| +25 | 50.5 | 1.00 | 50.50 | 56.50 | 50.50 | 50.50 | 0.00 | .00 | |
| 20-25 | 10.0 | .998 | 9.98 | 9.93 | 9.88 | 9.83 | .05 | .05 | .00 |
| 15-20 | 9.8 | .985 | 9.64 | 9.45 | 9.26 | 9.08 | .18 | .18 | .00 |
| 10-15 | 9.7 | .86 | 8.34 | 7.68 | 7.07 | 6.51 | .56 | .51 | .04 |
| 7-10 | 6.0 | .45 | 2.70 | 2.19 | 1.77 | 1.43 | .34 | .28 | .05 |
| 5-7 | 4.0 | .12 | .48 | .34 | .24 | .17 | .07 | .05 | .02 |
| 4-5 | 2.0 | .02 | .04 | .02 | .01 | .01 | .00 | | |
| -4 | 8.0 | | | | | | | | |
| Total | 100.0 | | 81.68 | 80.11 | 78.73 | 77.53 | 1.20 | 1.07 | .11 |

Total out the bottom { 77.53, .96, .06 }   Total out of top { 1.38, .13, .02 }

78.58    1.53

Total recycle to 1st stage 1.20+.11=1.31 per 100 feed bed 22 out of roaster 20 through conduit 26 into the second stage fluidized bed roaster 28.

In the second stage fluidized bed roaster 28 the pyrrhotite is mixed with an oxygen source and reacted according to the formula:

(2) $FeS_{1.2} + 1.95O_2 \rightarrow \frac{1}{2}Fe_2O_3 + 1.2SO_2$

The oxygen source, which may be supplied as air, is introduced into the windbox 30 of roaster 28 through inlet 32. The oxygen source rises through the windbox 30 to fluidize the bed 31 and react with the pyrrhotite, at about 900° C. to 1000° C. A set of cooling coils 36 having a water inlet 38 and a steam outlet 40 is situated in the bed 34 to remove the excess heat generated by this exothermic reaction. The $Fe_2O_3$ is discharged to waste through conduit 42 and the $SO_2$ rises from the bed into the freeboard 44 for discharge into the inlet of cyclone 46. The cyclone strips any elutriated particles which have been entrained with the rising $SO_2$ and discharges them as underflow to waste conduit 42. Since the major portion of the fine and critical size particles have been removed before the pyrite is introduced into the main roasting system the possibility of any fine $Fe_2O_3$ being carried out of roaster 28 and escaping the cyclone into roaster 20 is reduced to a permissible level.

The gaseous sulfur dioxide is discharged from the cyclone as overflow and rises through windbox 48 of roaster 20 to fluidize the bed 22 and react with the remainder of the fuel, representatively depicted as "Bunker-C" oil, $CH_{1.405}$, according to the formula:

(3) $2SO_2 + 1.48CH_{1.405} \rightarrow S_2 + 1.48CO_2 + 1.04H_2O$

The elemental sulfur and other gaseous products of the reactor rise through the bed into the freeboard 50 to join with the gaseous sulfur produced in reaction (1), above. A second cyclone 52 has its feed inlet connected to the freeboard discharge of roaster 20 to receive the gaseous products and any entrained solids. The cyclone 52 strips these entrained solids from the gas stream and returns them to the second roaster through conduit 54. The gaseous elemental sulfur is discharged from the of the original 100 grams of pyrite feed material approximately 81.68 grams remained after the first wet classification in cyclone 10; and, approximately 80.11 grams remained after the drying in fluid bed 14 and second classification in cyclone 16. This means that the 19.89% of an average pyrite size distribution which is of fines producing size is removed from the main roasting system in applicant's process. Thus the total out the bottom is now Grams
77.53
.96
.09
─────
78.58 the total out the top is

Grams
1.38
.13
.02
─────
1.53 and the total recycle to the first stage roaster is 1.20+.11=1.31 grams. The significance of these figures is two-fold, first, in an average size distribution of pyrite particles the total recycle figure per 100 grams of feed is reduced approximately from 5.57 to 1.31 grams. Second, the amount of pyrite dissociated in the first roaster 20 and lost to the electrostatic precipitator is reduced from 11.93 grams as shown in Table II to 1.53 grams, thus the heat load on roaster 20 is correspondingly, much less.

Referring now to FIG. 2 the sulfur/sulfur dioxide roasting system will be described in detail. As in the above described system the pyrite is first subjected to a classification in a hydrocyclone 10', a filter 12', a fluidized bed dryer 14' and a dry cyclone 16' to remove the fine critical size particles and dust. These particles were heretofore in the prior art being elutriated by the rising, spent, fluidizing gases, in the first reactor and were then recombining in the gas-to-liquid cooling apparatus by a reversal of the decomposition reaction. This creates a serious heat drain on the first reactor 60 and evolves extra heat in the sulfur recovery system. This classification is also set at about 15 microns to insure maximum removal of these extra fine particles from the main roasting system. The minus 15 micron particles report as overflow from the cyclones 10', 16' for further treatment in greater detail below. The plus which will be described in greater detail below. The plus 15 micron particles, i.e., those having a particle size in excess of 15 microns are then transferred through conduit 18' to the first reactor 60 for the first decomposition, the reaction here, as above, being:

(4) 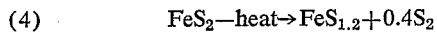 $FeS_2 - heat \rightarrow FeS_{1.2} + 0.4S_2$

The sulfur and other gaseous products of the combustion rise through the fluidized bed 62 into the freeboard 64 and exit into cyclone 66. Any elutriated particles are stripped by cyclone 66 and the sulfur, which represents approximately 40% of the total sulfur in the pyrite ore is then cleaned and cooled, to the liquid state, in a series of waste heat boilers, electrical precipitators and sulfur recovery units (not shown). As stated above, a serious problem existed in this system in that an inordinate amount of fine pyrite would be elutriated by the rising fluidizing gases and escape both the free-board and the cyclone to create a serious heat drain on reactor 60. Theoretically, this fine material was dissociated into pyrrhotite and sulfur. However, applicant has found that it has a tendency, when cooled for collection, to recombine by a reversal of the decomposition reaction. This reaction, which is exothermic, releases large quantities of heat energy where it is neither wanted nor needed. In addition, the sulfur dissociated from these fines in reactor 60 is done so at the considerable and non-recoverable expense of heat and space. By removing these very fine and critical size particles, as applicant has done, the efficiency of the system is no longer dependent upon the separating efficiency of the cyclone 66. Any plus 15 micron size particles which should be elutriated by the rising fluidizing gases are large enough to be easily stripped by the cyclone and thus the level of recombination of fine pyrite in the cooling system is reduced to tolerable limits.

The pyrrhotite from fluidized bed 62 and from the underflow of cyclone 66 is then transferred through conduit 68 to the second roaster 70. An oxygen source, such as air, enters into the windbox 72 and rises through the constriction plate 74 to fluidize the bed 76 and oxidize the pyrrhotite, the reaction here being:

(5) 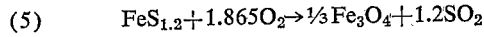 $FeS_{1.2} + 1.865O_2 \rightarrow \tfrac{1}{3}Fe_3O_4 + 1.2SO_2$

In this system the sulfur dioxide, which represents the approximately 60% of the remaining sulfur content of the pyrite ore, is used directly, i.e., it is cooled, in a manner well known in the art, and then fed into a contact unit (not shown) to produce sulfuric acid, which is easier to ship, store and use than is either gaseous or liquid sulfur dioxide.

The next step in applicant's process is the separate treatment of the fines-producing particles extracted from the feed pyrite in the above classification steps. The overflow from cyclones 10 and 16 are transferred through conduit 80 to a thickener 82; the product of cyclone 16 first passing through a scrubber 84 to remove the entraining gas. After being thickened to a properly treatable consistency the fine pyrite is introduced to a fluidized bed roaster 86 where it is decomposed and oxidized to produce sulfur dioxide gas. The oxygen source enters the windbox 88 of roaster 86 and proceeds upwardly into the bed 90 to fluidize and react with the fine pyrite. The sulfur dioxide generated from the fines rises through the freeboard 94 and is discharged to a cyclone 96, a waste heat boiler 98 and a scrubber-cooler 100, to reduce its temperature and purify it by removal of dust and moisture.

In the all-sulfur, roasting process the sulfur dioxide reenters the main roasting system through conduit 102 from which it may be shunted to either or both of two alternative uses. Valve 104 can be closed and valve 106 opened and the sulfur dioxide can be fed into the second roaster 28 to enrich the total yield of elemental sulfur. In this alternative the sulfur dioxide from the auxiliary system will join with the sulfur dioxide generated from the oxidation of the pyrrhotite and rise through cyclone 46 for the final decomposition into elemental sulfur. The alternative to this use is to open valve 104 and close valve 106 and transfer the sulfur dioxide to a contact tank (not shown) to generate sulfuric acid in a manner well known in the art. It is understood, of course, that valves 104 and 106 may both be opened, each alternative use drawing a portion of the $SO_2$ from the auxiliary system depending upon needs, and capacities, etc.

In the sulfur/sulfur dioxide roasting system, all the sulfur dioxide produced in the auxiliary roasting system is used to enrich the yield of sulfuric acid generated from the product of the second roaster 70.

As this invention may be embodied in several forms without departing from the spirit or essential character thereof, the present embodiment is illustrative and not restrictive. The scope of the invention is defined by the appended claims rather than by the description preceding them, and all embodiments which fall within the meaning and range of equivalency of the claims are, therefore, intended to be embraced by those claims.

I claim:

1. In a process for recovering elemental sulphur from finely divided pyritic ores by stagewise fluidized bed treatment which comprises establishing and maintaining a bed of finely divided solids derived from said pyritic ores in a first fluidized bed treatment zone maintained at a temperature between about 690° C. and about 740° C. to partially decompose said ore thereby generating the labile sulphur atom in said ore and leaving a residue of partially desulphurized ore, establishing and maintaining a bed of solids derived from the thus partially desulphurized ore in a second fluidized bed treatment zone maintained at a temperature between about 900° C. and about 1000° C., to substantially completely remove the sulphur from said partially desulphurized ore thereby producing hot $SO_2$-containing gases and an iron oxide residue, the combination with said process of the improvements comprising;

(a) subjecting said finely divided pyritic ores prior to fluidized bed treatment to at least one classification step to separate as an overflow product the particles below about 25 microns and as an underflow product the particles over about 25 microns, (b) introducing said underflow product into said first treatment zone while simultaneously introducing fuel directly into said first treatment zone, (c) continuously transferring partially desulphurized ore from said first zone to said second zone, (d) introducing into said second zone an oxygen-containing gas at velocity sufficient to fluidize the bed of solids maintained therein and generating hot $SO_2$-containing gases in said second zone, (e) continuously passing the hot $SO_2$-containing gases from said second zone into said first zone for fluidizing the bed of solids maintained therein and effecting incomplete combustion of said fuel, thereby producing heat and reducing agents to reduce said $SO_2$ to elemental sulphur, and (f) discharging elemental sulphur-containing gases from said first zone and iron oxide residues from said second zone.

2. The process of claim 1, wherein said overflow product of said classification step is separately roasted in a third fluidized bed treatment zone at a temperature between about 900° C. and about 1000° C. to decompose said overflow ores to produce $SO_2$-containing gases and iron oxide residue, and passing said $SO_2$-containing gases into said first zone.

3. The process of claim 2, wherein said $SO_2$-containing gases are passed through a cyclone separation zone and a scrubber to remove iron oxide dust prior to introduction into said first zone.

4. The process of claim 2, wherein the pyritic ore particles in the overflow product from said classification step are thickened prior to introduction into said third treatment zone.

References Cited
UNITED STATES PATENTS

| | | |
|---|---|---|
| 2,129,760 | 9/1938 | Greenwalt. |
| 2,530,630 | 11/1950 | Renken. |
| 2,683,077 | 7/1954 | Lewis. |
| 2,993,778 | 7/1961 | Johannsen. |
| 3,251,677 | 5/1966 | Jolley. |

OSCAR R. VERTIZ, Primary Examiner

G. O. PETERS, Assistant Examiner

U.S. Cl. X.R.

23—227; 75—6, 9